(12) United States Patent
Smith et al.

(10) Patent No.: US 7,495,837 B2
(45) Date of Patent: Feb. 24, 2009

(54) COLLIMATING LENS STRUCTURES

(75) Inventors: George E. Smith, Sunnyvale, CA (US);
Tong Xie, San Jose, CA (US)

(73) Assignee: Avago Technologies General IP (Singapore) Pte. Ltd, Singapore (SG)

( * ) Notice: Subject to any disclaimer, the term of this patent is extended or adjusted under 35 U.S.C. 154(b) by 0 days.

(21) Appl. No.: 11/048,470

(22) Filed: Jan. 31, 2005

(65) Prior Publication Data
US 2006/0171039 A1 Aug. 3, 2006

(51) Int. Cl.
*G02B 27/30* (2006.01)
*G02B 27/10* (2006.01)
*G02B 3/00* (2006.01)

(52) U.S. Cl. .................. 359/641; 359/618; 359/648
(58) Field of Classification Search .......... 359/641, 359/618, 737, 648, 720
See application file for complete search history.

(56) References Cited

U.S. PATENT DOCUMENTS

| 5,414,551 | A | 5/1995 | Okazaki et al. | |
|---|---|---|---|---|
| 5,572,367 | A | 11/1996 | Jung et al. | |
| 5,917,105 | A | 6/1999 | Xu et al. | |
| 6,181,476 | B1 * | 1/2001 | Medvedev et al. | 359/641 |
| 6,356,395 | B1 * | 3/2002 | Tawa et al. | 359/642 |

\* cited by examiner

*Primary Examiner*—William C Choi
*Assistant Examiner*—Jack Dinh

(57) ABSTRACT

An optic element receives an input light beam with a first beam angle and an axis. The optic element includes a first surface that receives the input light beam and generates an expanded light beam with a second beam angle that is greater than or equal to the first beam angle. The optic element includes a second surface that receives the expanded light beam and generates an output light beam that is either substantially collimated or near collimated. The output light beam is tilted a predetermined degrees with respect to the axis of the input light beam.

20 Claims, 9 Drawing Sheets

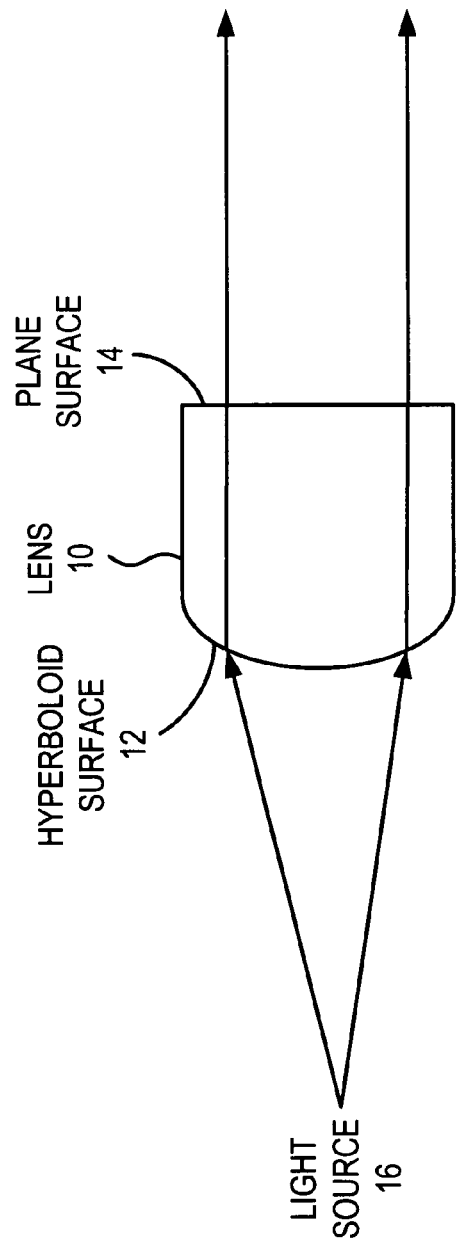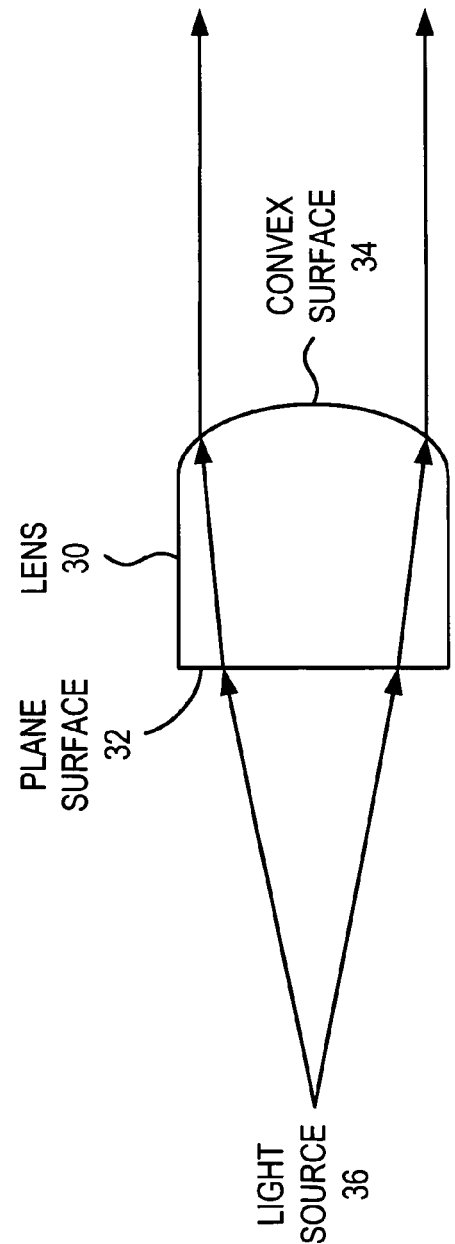

COLLIMATING LENS STRUCTURES

FIELD OF THE INVENTION

The present invention relates generally to collimating lens structures, and more particularly, to collimating lens structures with tilted output beam that perform beam expansion and collimating.

BACKGROUND OF THE INVENTION

Collimator lenses that are formed in glass or plastics are well known. FIG. 1 illustrates a first prior art collimator lens 10. The first prior art collimator lens 10 includes a hyperboloid surface 12 and a plane surface 14. A light source 16, such as a laser, generates a light beam 18 that generally diverges with a beam angle or width. After passing through the prior art lens 10, the light beams 20 are generally parallel. It is noted that the hyperboloid surface 12 performs the collimating function.

FIG. 2 illustrates a second prior art collimator lens 30. The second prior art collimator lens 30 includes a plane surface 32 and a convex surface 34. A light source 36, such as a laser, generates a light beam 38 that generally diverges with a first beam angle. After passing through the prior art lens 30, the light beams 32 are generally parallel. It is noted that the convex surface 34 performs the collimating function.

Unfortunately, these two prior art approaches suffer from several drawbacks or disadvantages. First, in compact space-limited applications, such as an optical mouse product, the prior art collimators consume too much space along the axis from the light source to the surface from which the light beam reflects. Second, there are systems and applications where a titled beam is required. However, the tilting of the laser imposes severe tolerance conditions that are difficult and costly to achieve in manufacturing.

Based on the foregoing, there remains a need for an optic element that overcomes the disadvantages set forth previously.

SUMMARY OF THE INVENTION

According to one embodiment of the present invention, an optic element and method for optically expanding, collimating, and bending or tilting a light beam are described. An optic element receives an input light beam with a first beam angle and an axis. The optic element includes a first surface that receives the input light beam and generates an expanded light beam with a second beam angle that is greater than or equal to the first beam angle. The optic element includes a second surface that receives the expanded light beam and generates an output light beam that is either substantially collimated or near collimated. The output light beam is tilted a predetermined degrees with respect to the axis of the input light beam.

BRIEF DESCRIPTION OF THE DRAWINGS

The present invention is illustrated by way of example, and not by way of limitation, in the figures of the accompanying drawings and in which like reference numerals refer to similar elements.

FIG. 1 illustrates a first prior art collimator.

FIG. 2 illustrates a second prior art collimator.

DETAILED DESCRIPTION

Collimating lens structures with tilted output beam are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Collimator Lens Structure

Figure 3:
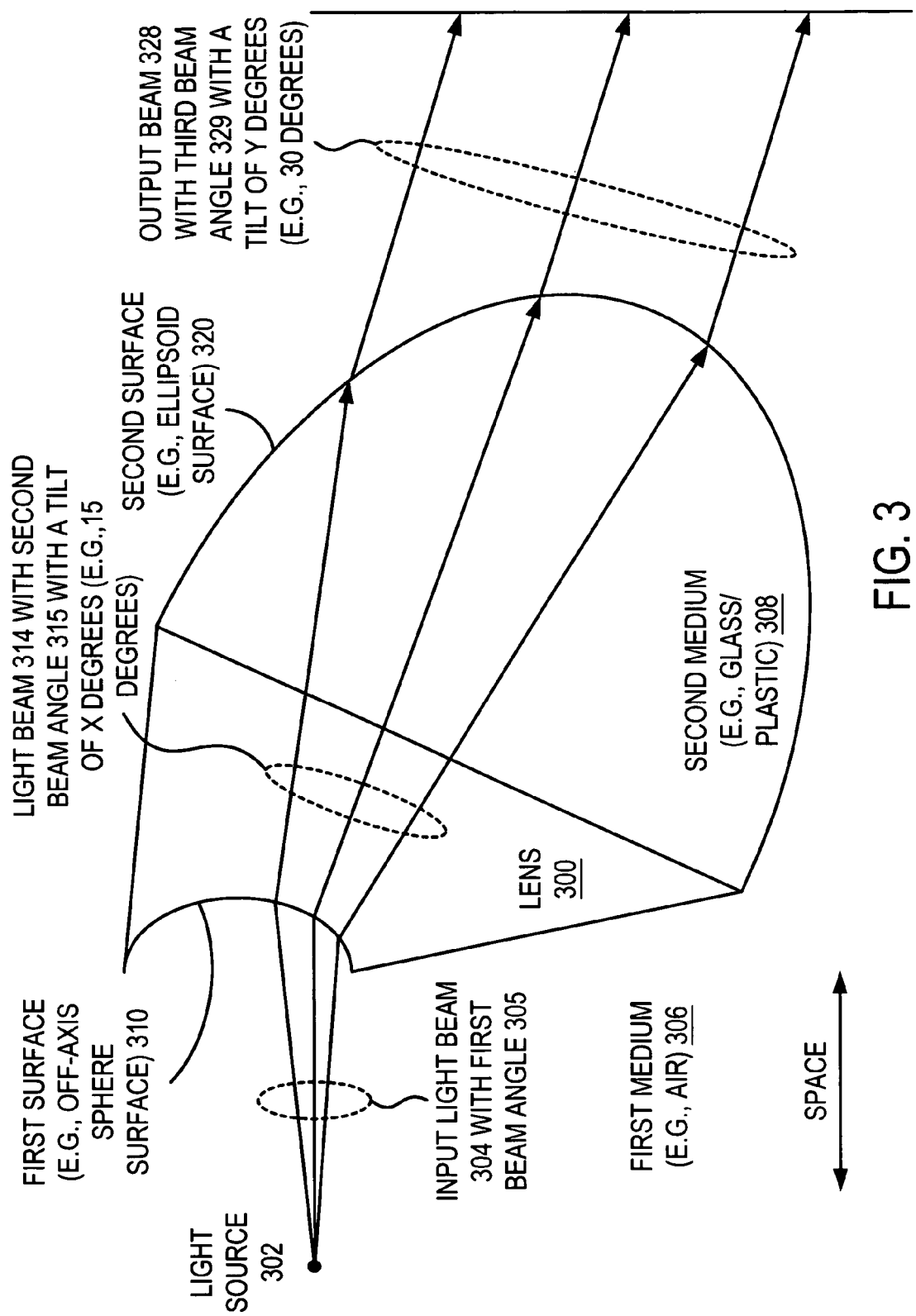
FIG. 3 illustrates an optic element according to one embodiment of the present invention.

FIG. 3 illustrates an optic element 300 according to one embodiment of the present invention. A light source 302 that generates a light beam 304 (also referred to herein as an "input light beam 304") with a first beam angle 305 is provided. The light source 302 can be, for example, a laser or a light emitting diode (LED). The light source 302 directs the light beam 304 with the predetermined beam angle 305 along a predetermined axis to the lens structure 300 according to the invention. The predetermined axis is also referred to herein as the "input light source axis" or the "central axis of the light source." In one example, the light source 302 generates a light beam 304 that has narrow beam angle 305 of about +/−6.5 degrees. The light source 302 is positioned in a first medium 306, such as air.

The optic element (also referred to herein as a "lens structure") 300 includes a first surface 310 and a second surface 320. The first surface 310 can be a sphere surface, and the second surface 320 can be an ellipsoid surface. In one embodiment, the first surface 310 is positioned offset from the central axis of the light source 302. In other words, first surface 310 is position "off" of the central axis of the light source 302. In this regard, the surface 310 is also hereinafter referred to as an "off-axis first surface 310"). In this example, an axis passing through the center of a sphere of which the first surface 310 is a part is generally parallel to the central axis of the light source 302, but not the same as the central axis of the light source 302.

The first surface 310 receives light beam 304 with the first beam angle 305 and generates a light beam 314 with a second beam angle 315. The first surface 310 also optionally bends the light beam 304 by a predetermined amount (e.g., X degrees). For example, in one embodiment, the first surface 310 performs one or more of the following optical functions: 1) optically expands the light beam 304 to a predetermined beam angle (e.g., a second beam angle 315) that is greater than or equal to the original beam angle (e.g., first beam angle 305) of the beam 304 from the light source 302 and also 2) optically bends or tilts the light beam 304 a predetermined angle (e.g., a tilt of X degrees). In one embodiment, the tilt or bend generated by the first surface 310 is about 15 degrees. The optical expansion of the light beam 304 and the bending of the light beam 304 performed by the first surface 130 are described in greater detail hereinafter.

The second surface 320 receives the expanded and once-tilted light beam 314 and generates an output light beam 328 with a third beam angle 329. The second surface 320 also optionally bends the light beam 314 by a predetermined amount for a total of Y degrees. For example, in one embodiment, the second surface 320 receives the expanded and once-tilted light beam 314 and generates an output light beam 328 that is substantially collimated or near collimated (e.g., slightly converging rays or slightly diverging rays) with a total tilt of Y degrees (e.g., a total tilt of 30 degrees). The second surface 320 performs one or more of the following optical functions: 1) optically collimates the expanded, once-tilted light beam 314 and 2) optically further bends or tilts the expanded, once-tilted light beam 314.

In one example, the second surface 140 further bends the light beam 314 to create an output beam with a total tilt specified by a predetermined angle (Y). The optical collimating of the beam and the bending of the light beam performed by the second surface 320 are described in greater detail hereinafter.

In one embodiment, the optic element generates an output light beam that is near collimated (e.g., a beam with light rays that may be slightly diverging or slightly converging). In another embodiment, the optic element generates an output light beam with light rays that are collimated or substantially collimated. Substantially collimated means an output beam with a beam angle that is significantly smaller or very much smaller than the first beam angle of the input light beam received by the optic element (e.g., an output light beam with a near zero divergence).

The optic element 300 can be manufactured from a material such as glass or plastic or other material known to those or ordinary skill in the optical element manufacturing arts.

In one embodiment, optic element 300 is implemented with a single lens element that includes a first moldable surface that produces an ideal diffraction limited refraction and a second moldable surface that produces an ideal diffraction limited refraction. In this embodiment, the single lens element 300 is implemented with a beam expander collimator with a built-in minimum deviation prism that enables a predetermined beam tilt from the input light source axis (e.g., laser axis). In one example, the optic element tilts the input light beam by Y-degrees (e.g., 30 degree). The optical architecture according to the invention produces a tilted beam in a space shorter than prior art approaches and further provides low wavefront aberration.

Exemplary First Surface 420

Figure 4:
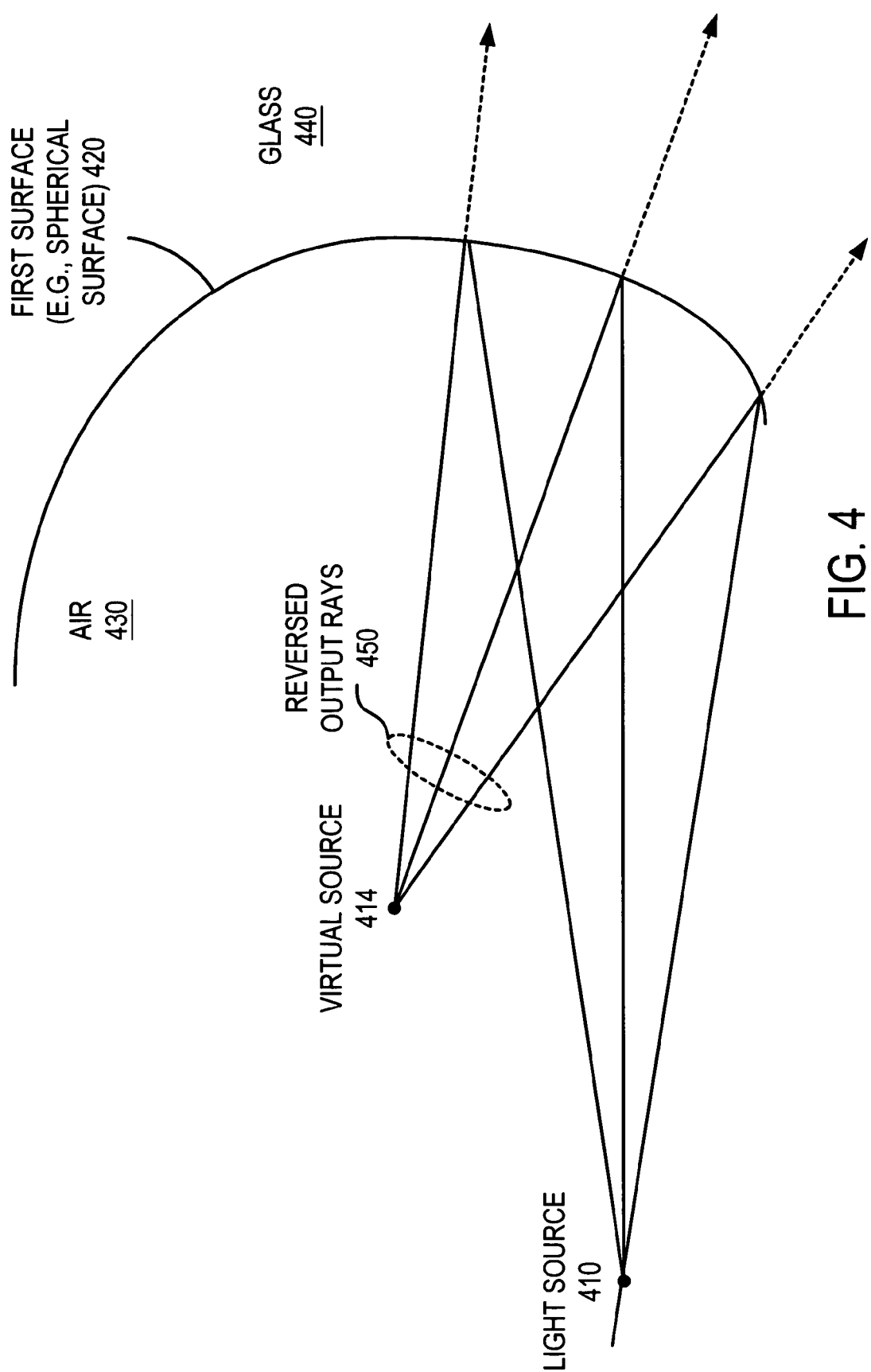
FIG. 4 illustrates an exemplary spherical surface as the first surface and the titled expanded beam angle generated by the spherical surface according to one embodiment of the present invention.

FIG. 4 illustrates an exemplary spherical surface 420 as the first surface according to one embodiment of the present invention. A light source 410 generates a light beam that is directed at the spherical surface 420. The surface 420 receives the light beam from the light source 410 and generates output light rays (e.g., a tilted and expanded light beam) as shown in FIG. 3. When the output light rays are reversed, the reversed output rays 450 pass through a virtual source 414. It is noted that the virtual source 414 is positioned in a first medium 430 (e.g., air). The output light rays generated by the first surface 420 travel in a second medium 440 (e.g., glass or plastic).

Exemplary Second Surface 520

Figure 5:
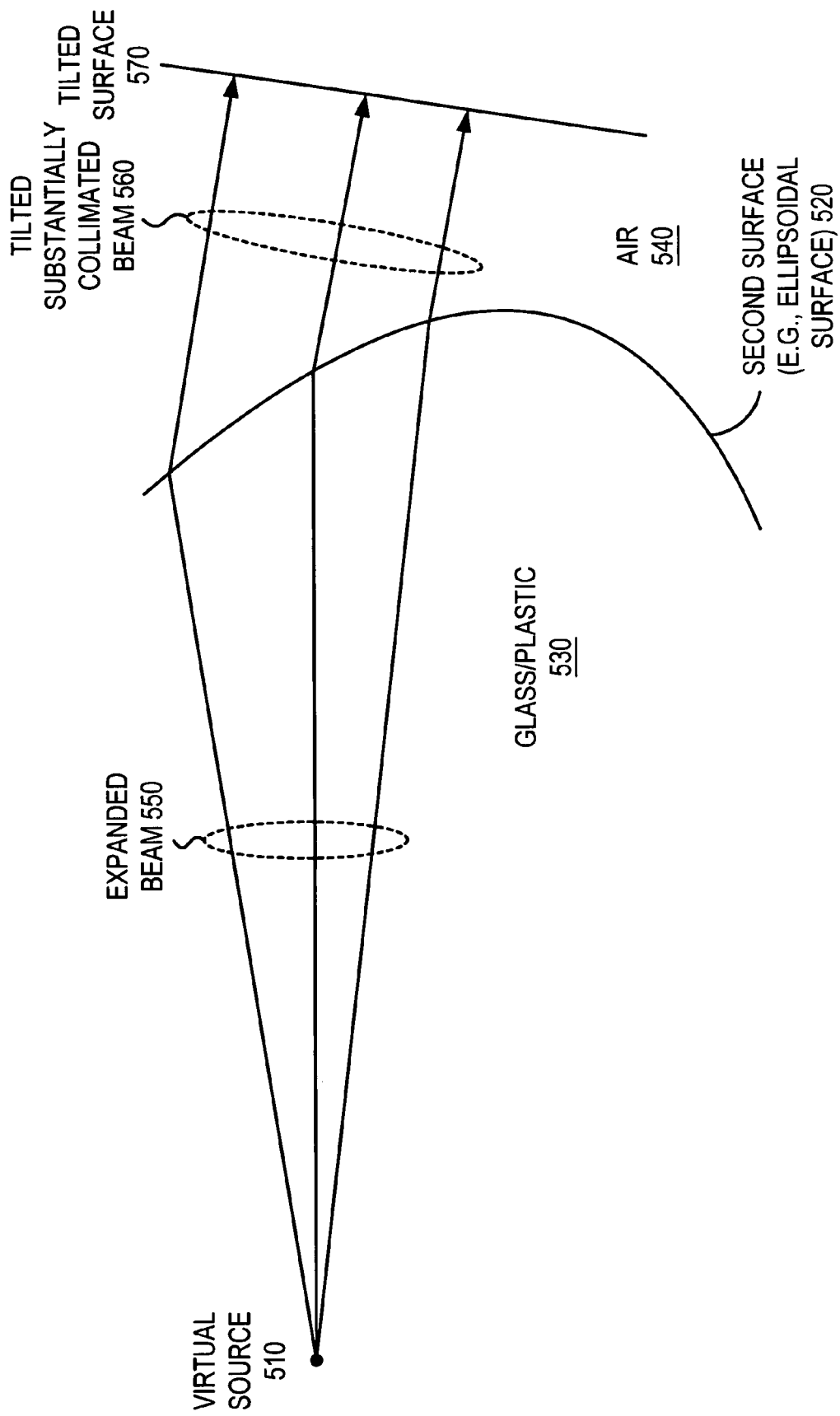
FIG. 5 illustrates an exemplary ellipsoidal surface as the second surface and the titled substantially collimated beam generated by the ellipsoidal surface according to one embodiment of the present invention.

FIG. 5 illustrates an exemplary ellipsoidal surface 520 as the second surface and the titled substantially collimated beam generated by the ellipsoidal surface 520 according to one embodiment of the present invention. A virtual source 510 generates an expanded light beam 550 that is directed at the second surface 520. The expanded light beam 550 travels in a second medium 530 (e.g., glass or plastic). The second surface 520 receives the expanded light beam 550 from the virtual source 510 and generates output light rays (e.g., a tilted and substantially collimated light beam 560). The second surface 520 may be implemented as an ellipsoidal surface. The output light rays travel in another medium (e.g., air) and impinge a tilted surface 570.

Kappa Value for Ellipsoid

An ellipsoid may be described by the following expression:

$$Sag = \frac{cr^2}{1 + \sqrt{1-(1+\kappa)c^2r^2}},$$

where K is kappa (represented by K or κ), a parameter for determining the type of conic and where c=1/R is the curvature at the pole. For example, when K=0, the conic is a sphere, and when K=−1, the conic is a paraboloid. The conic is an ellipsoid when −1<=K<=0. In one embodiment, a range for kappa (designated by "K") is as follows: $-1.4/n^2 <= K <= 0.7/n^2$. For example, in another embodiment, a range for kappa (designated by "K") is as follows: $-1.2/n^2 <= L <= 0.85/n^2$. In one specific implementation, K is selected to be equal to about $-1/n^2$.

First Surface Spacing from a Light Source

Figure 6:
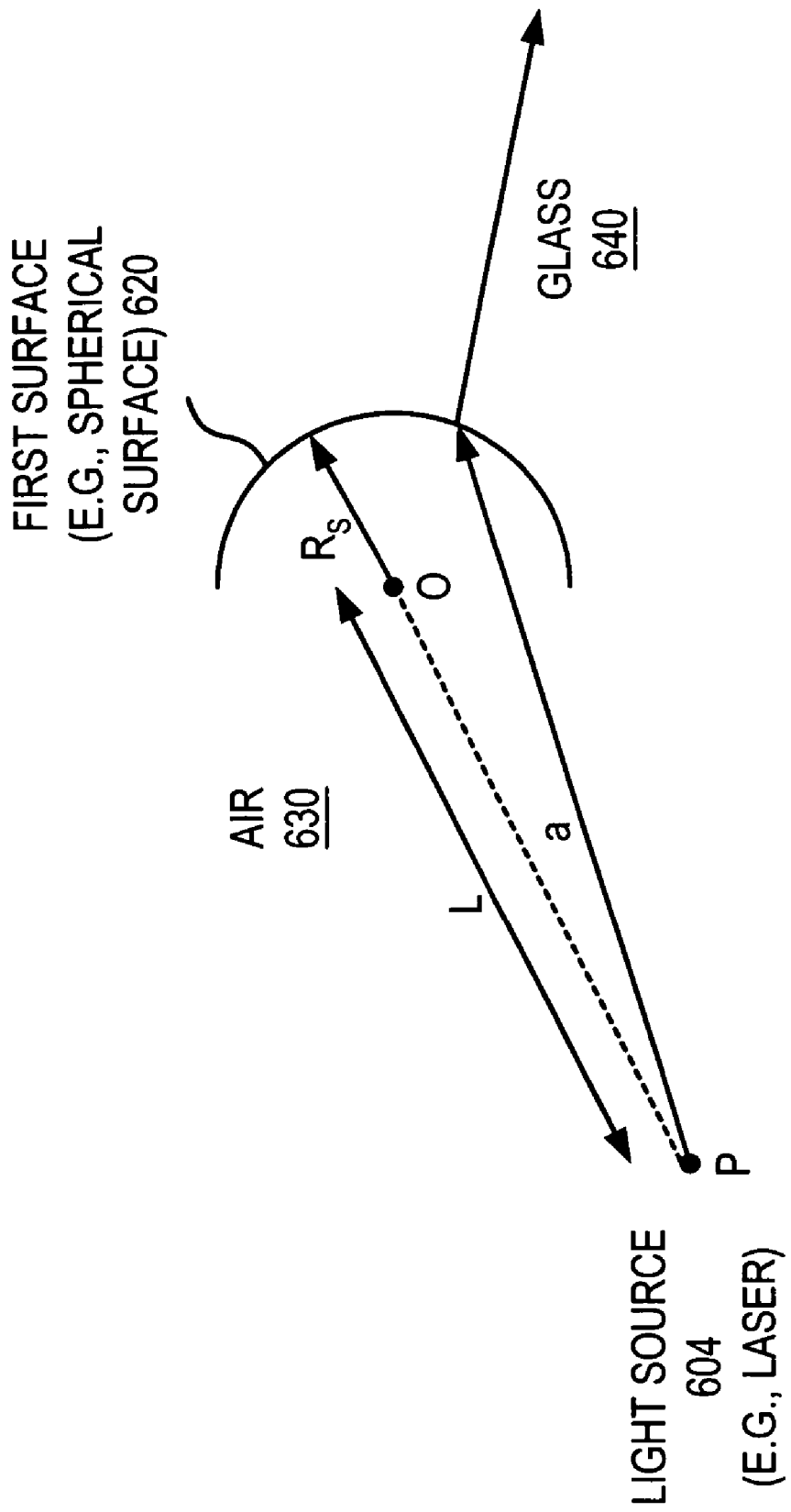
FIG. 6 illustrates an exemplary first surface and the spacing of the first surface with respect to a light source according to one embodiment of the present invention.

FIG. 6 illustrates an exemplary first surface 620 and the spacing of the first surface 620 with respect to a light source 604 according to one embodiment of the present invention. Referring to FIG. 6, for a sphere of radius ($R_S$) and lens material index (n), the light source (P) (e.g., a laser) in another medium (e.g., air) is a predetermined distance (L) from the center of curvature of the sphere (O). The predetermined distance ($g*R_S$), where g is some real number, may vary and be selected from a range of values. For example, in one embodiment, a range for the distance (designated by "L") between the light source (P) and the center of the curvature of the sphere (O) is as follows: $R_S <= L <= 2.5 R_S$. For example, in another embodiment, a range for the distance (designated by "L") between the light source (P) and the center of the curvature of the sphere (O) is as follows: $1.25 R_S <= L <= 2.0 R_S$.

First Surface Tilt

A light beam (e.g., a laser beam) may be aimed at an off-axis angle (denoted by "a"). The off-axis angle is the angle between the ray and the radius of sphere. For example, in one embodiment, a range for the angle (designated by "a") between the center axis of the sphere and the axis of the light beam is as follows: 5 degrees<=a<=45 degrees. For example, in another embodiment, a range for the angle (designated by "a") between the center axis of the sphere and the axis of the light beam is as follows: 10 degrees<=a<=35 degrees. In one specific implementation, "a" is selected to be equal to about 20 degrees.

Second Surface Spacing from a Virtual Source

Figure 7:
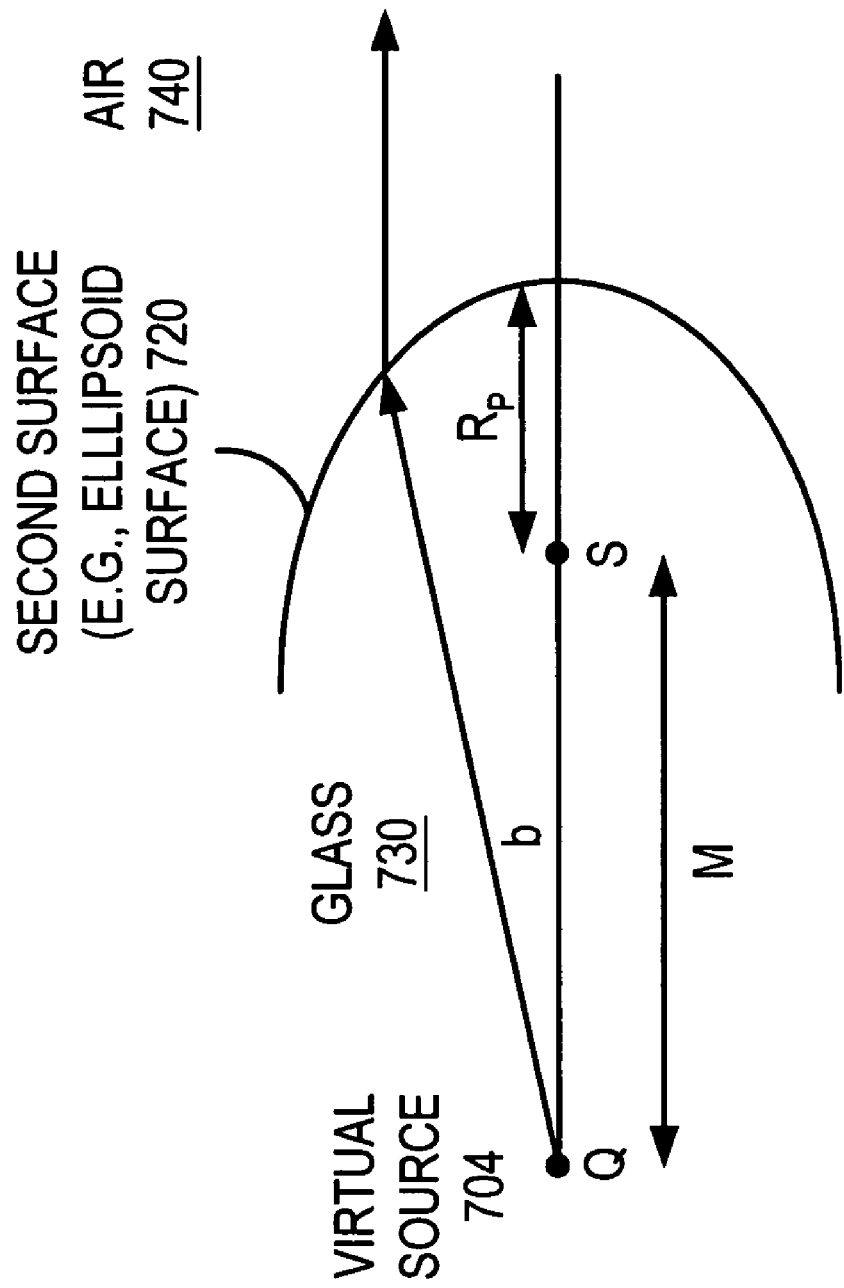
FIG. 7 illustrates an exemplary second surface and the spacing of the second surface with respect to a virtual light source according to one embodiment of the present invention.

FIG. 7 illustrates an exemplary second surface 720 and the spacing of the second surface 720 with respect to a virtual source 704 according to one embodiment of the present invention. Referring to FIG. 7, for an ellipsoid of polar radius ($R_P$), a virtual source (Q) lies on the axis a distance (denoted by "M") from the center of curvature (S) at the pole. The predetermined distance ($h*R_P$), where h is some real number, may vary and be selected from a range of values. For example, in one embodiment, a range for the distance (designated by "M") between the virtual source (Q) and the center of the curvature of the ellipsoid (S) is as follows: $0.7R_P/(n-1)<=M<=1.4R_P/(n-1)$. For example, in another embodiment, a range for the distance (designated by "M") between the virtual source (Q) and the center of the curvature of the ellipsoid (S) is as follows: $0.85R_P/(n-1)<=M<=1.2R_P/(n-1)$. In one specific implementation, M is selected to be equal to about $R_P/(n-1)$.

Second Surface Tilt

A light beam (e.g., a laser beam) may be aimed at an off-axis angle (denoted by "b"). The off-axis angle is the angle between the ray and the long axis of the ellipsoid. For example, in one embodiment, a range for the angle (designated by "b") between the center axis of the ellipsoid and the axis of the light beam is as follows: 2 degrees<=b<=30 degrees.

Deviation Split at the Two Surfaces

Figure 8:
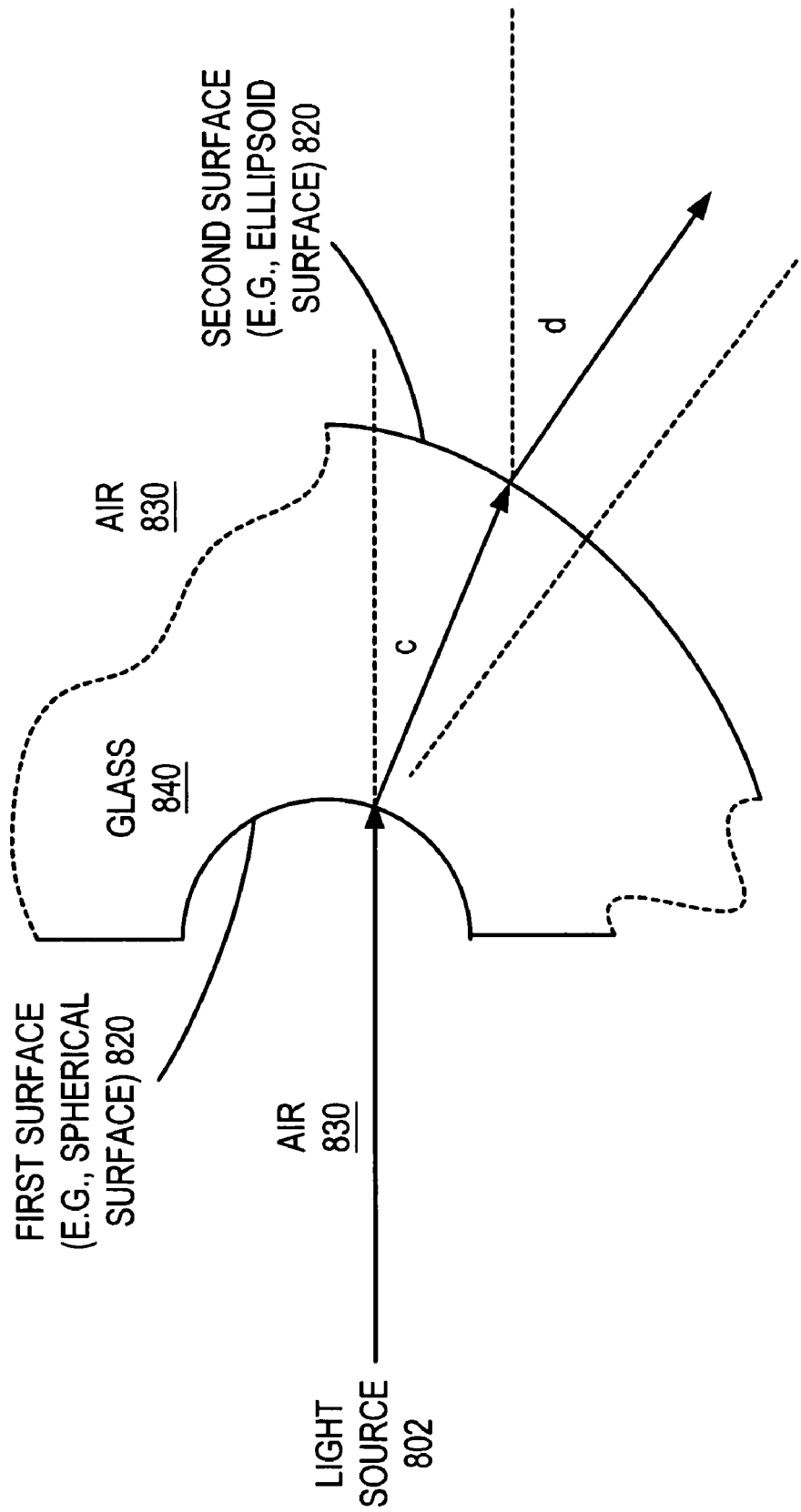
FIG. 8 illustrates an exemplary optic element that includes a first surface and second surface and the amount of bending by the first surface, the amount of bending of light by the second surface, and the total amount of bending performed by the optic element according to one embodiment of the present invention.

FIG. 8 illustrates an exemplary optic element that includes a first surface and second surface and the amount of bending by the first surface, the amount of bending of light by the second surface, and the total amount of bending performed by the optic element according to one embodiment of the present invention.

Referring to FIG. 8, the total amount of tilt or optical bending performed by the optic element is expressed in d degrees. The amount of optical tilt performed by the first surface may be expressed in degrees and denoted by the letter "c". The fraction (f) of the total tilting or bending at either the first surface or the second surface over the total amount of optical tilt (denoted by the letter "d") may be determined. This fraction (f) can be used to describe the allocation of optical bending or tilting between the two surfaces of the optical element for a particular embodiment of the invention. The fraction can represent the amount of bending or tilt caused by the first surface divided by the total tilt caused by the optic element or the amount of bending or tilt caused by the second surface divided by the total tilt caused by the optic element. For example, the fraction of bending by the first surface may be expressed as f=c/d. Similarly, the fraction of bending by the second surface may be expressed as f=e/d, where "e" is the amount of tilt caused by the second surface as measured from a projected path of a ray of the beam received by the second surface.

For example, in one embodiment, a range for the fraction of total deviation of the central ray at either surface (designated by "f") is as follows: ⅓<=f<=⅔. For example, in another embodiment, a range for the fraction of total deviation of the central ray at either surface (designated by "f") is as follows: 0.4<=f<=0.6. In one specific implementation, in which it is determined that it is preferable for each surface to perform about the same amount of optical tilting or bending (i.e., the fraction of the first surface is about equal to the fraction of the second surface), the fraction (f) is selected to be equal to about 0.5 or ½.

Optical Processing

Figure 9:
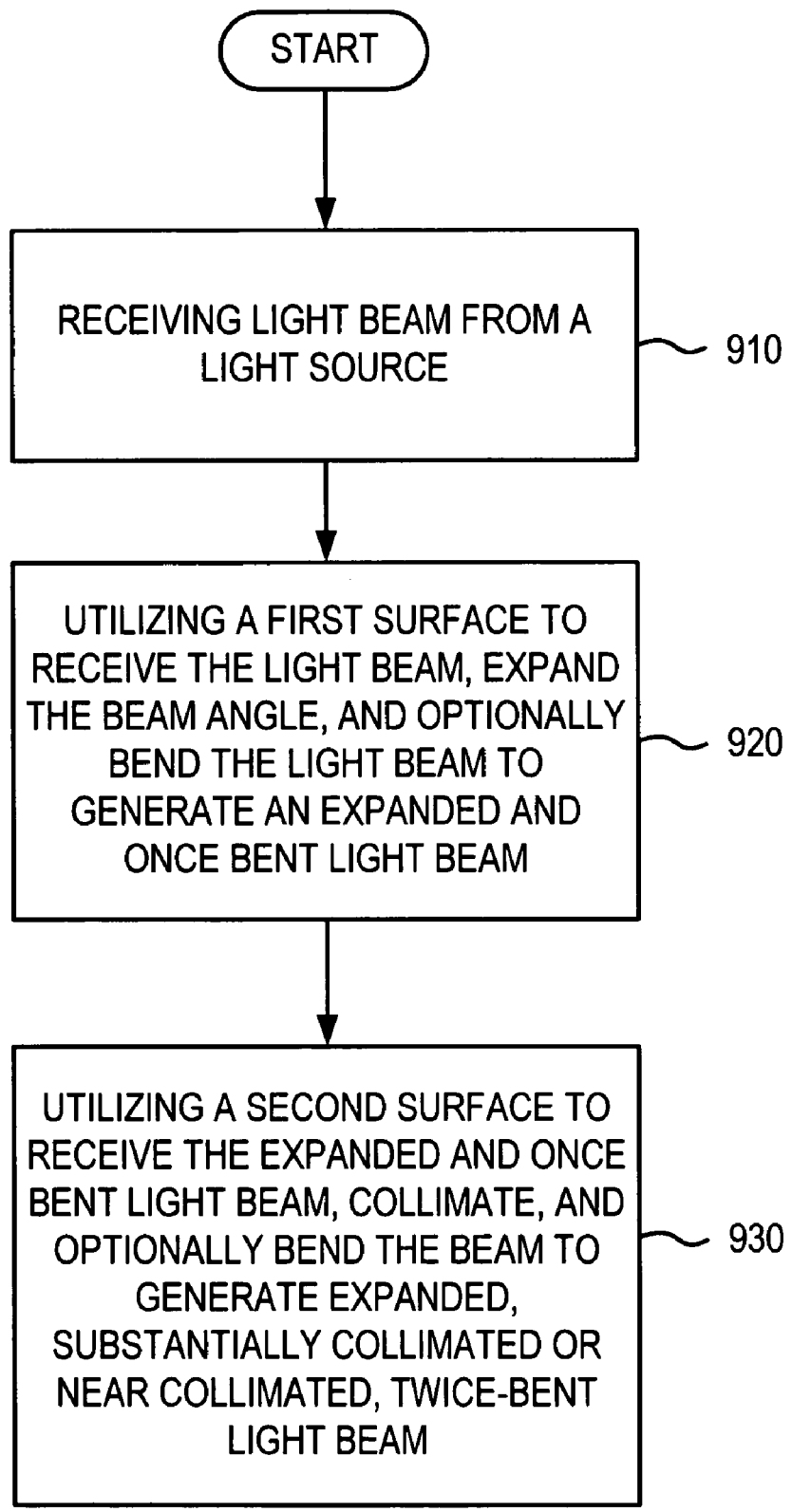
FIG. 9 is a flowchart illustrating the optical processing steps performed by the optic element according to one embodiment of the present invention.

FIG. 9 is a flowchart illustrating the optical processing steps performed by the optic element according to one embodiment of the present invention. The method for optically expanding, collimating, and bending a light beam includes the following steps. In step 910, a light beam is received from a light source, for example. In step 920, the received light beam angle is expanded and optionally bent to generate an expanded and once bent light beam. The optical functions set forth in step 920 may be performed by a first surface (e.g., a spherical surface). In one embodiment, the spherical surface is a Weierstrass or aplanatic sphere. It is noted that in some embodiments, the beam angle is expanded, but no bending of the light beam occurs in step 920 (e.g., the light beam is not tilted). In these embodiments, the light beam bending or tilting occurs in step 930.

In step 930, the expanded and once bent light beam is collimated and optionally bent to generate an expanded, substantially collimated or near collimated, twice-bent light beam. The optical functions set forth in step 930 may be performed by a second surface (e.g., an ellipsoid surface). It is noted that in some embodiments, the light beam is collimated, but no bending of the light beam occurs in step 930 (e.g., the light beam is tilted or bent in step 920). In another embodiment, the light beam is tilted a first predetermined amount (e.g., 50% of the total tilt caused by the optic element) in step 920 and tilted a second predetermined amount (e.g., 50% of the total tilt caused by the optic element in step 930).

Optical Navigation Device 1000

Figure 10:
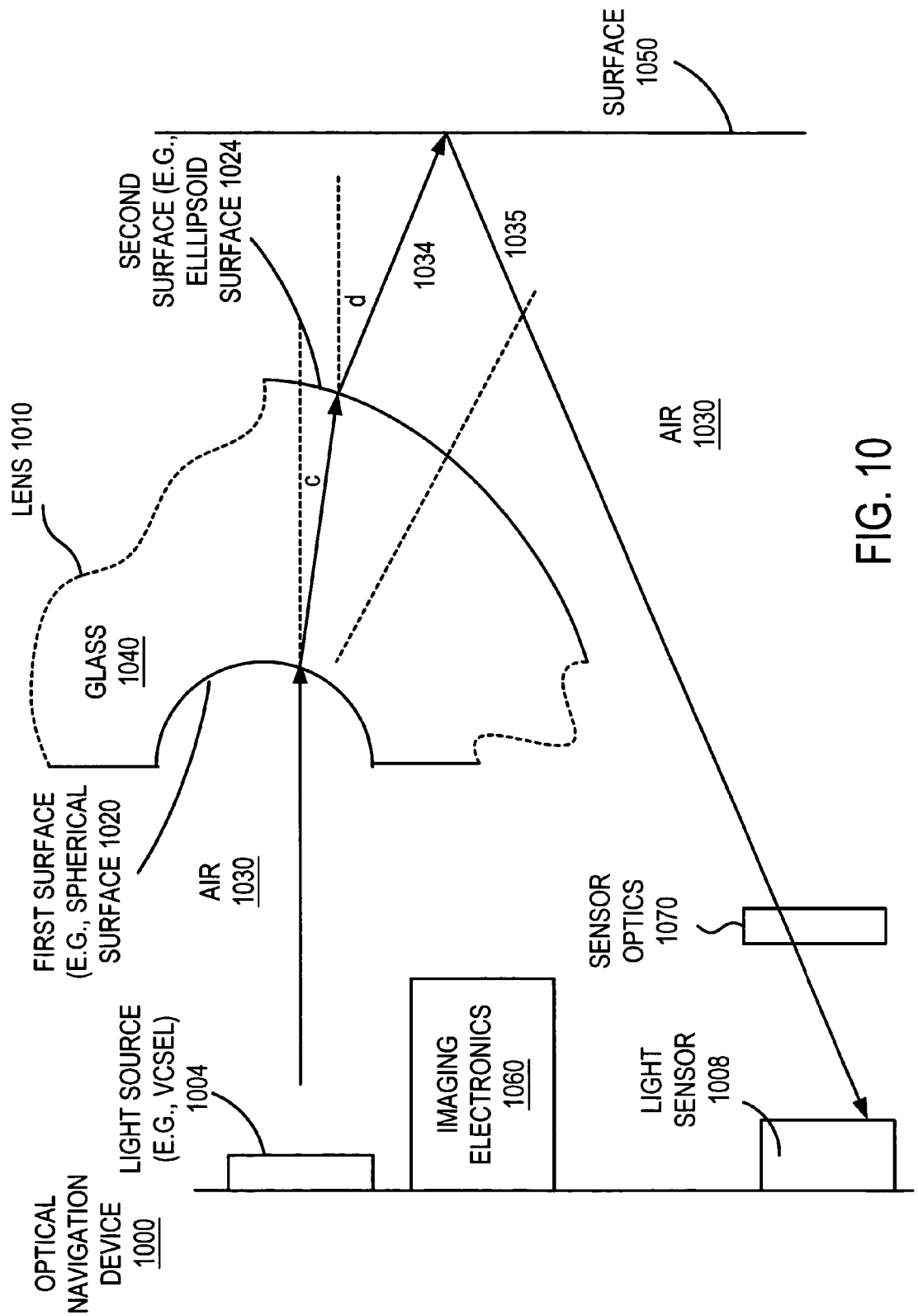
FIG. 10 is a block diagram of an optical navigation device that utilizes the optic element according to another embodiment of the invention.

FIG. 10 is a block diagram of an optical navigation device 1000 that utilizes the optic element 1010 according to one embodiment of the invention. The optical navigation device 1000 includes a light source 1004 and a light sensor 1008. The light source 1004 can be, for example, a laser light source, and the light sensor 1008 can be an imager integrated circuit. The optical navigation device 1000 is a cursor control device (e.g., a mouse), which is often referred to as an optical mouse and is generally more accurate and requires less maintenance than the mechanical mouse that uses a mechanical ball.

The optical navigation device 1000 rides on or is moved along a surface 1050 (e.g., a table top surface, work surface, or a mouse pad) by a user. The optical navigation device 1000 operates in the following manner: 1) light is generated and directed to the surface 1050; 2) light is reflected from the surface 1050 and captured by the device 1000; 3) based on the captured images the device 1000 determines the cursor movement.

The optical navigation device 1000 includes imaging electronics 1060 for performing image processing on the received images. The optical navigation device 1000 also includes a collimating lens 1010 according to the invention. The collimating lens 1010 includes a first surface 1020 and a second surface 1030 and generates a tilted expanded, collimated light beam 134 and directs this beam to the surface.

It is noted that the optic element 1010 optically bends the light so that the light source 1004 can be mounted "flat" in a plane that is generally parallel with a surface 1050 on which an optical navigation device 1000 rests or sits. The surface 1050 can be, for example, a mouse pad surface or table top surface. The beam from the collimating lens 1010 is then reflected off the surface 1050. The reflected beam 1035 then passes through sensor optics 1070 and then is detected by the light sensor 1008.

The optic lens according to the invention achieve certain optical advantages because of its special geometry that employs a first surface for expanding the light beam and bending the light beam and a second surface for collimating the light beam and further bending the light beam. It is noted that one or more of the above optical functions can be performed entirely by either the first surface, entirely by the second surface, or divided between the first and second surfaces. For example, either the first surface or the second surface can perform all the bending or tilting of the light beam.

Although the collimating lens structures of the invention has been described by the various embodiments shown in the figures, other arrangements can be devised in accordance with the teachings of the invention to realize other lens structures that perform one or more of the following functions: optical beam angle expansion, optical collimating, and optical bending or tilting.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. An optic element, comprising:
   a first surface comprising a sphere, the first surface configured to receive an input light beam at a first off-axis angle a, from a light source located at a predetermined distance L from the center of curvature of the sphere, and generate therefrom, an expanded light beam, wherein the predetermined distance L is equal to a product of the radius Rs of the sphere and a real number g that is selected from a range of values;
   a second surface configured to receive the expanded light beam at a second off axis angle b with reference to a central axis of the expanded light beam, and generate therefrom an output light beam.

2. The optic element of claim 1 wherein at least one of the first surface and the second surface provides a tilting of the output light beam with respect to a central axis of the input light beam.

3. The optic element of claim 2 wherein the first surface provides about 50% of the tilting; and wherein the second surface provides about 50% of the tilting.

4. The optic element of claim 1 wherein the second surface is configured to generate a substantially collimated output light beam.

5. The optic element of claim 1 wherein the second surface is an ellipsoid surface.

6. The optic element of claim 1 wherein the output beam includes one of slightly converging rays and slightly diverging rays.

7. The optic element of claim 1 wherein the output light beam comprises collimated rays.

8. The optic element of claim 1 wherein the optic element is manufactured from one of glass and plastic.

9. The optical navigation device of claim 1, wherein the shape of the first surface is selected to locate a first virtual source at a location away from the light source.

10. The optical navigation device of claim 9, wherein the second surface is an ellipsoid having a polar radius Rp that is selected to locate a second virtual source at a distance M from the center of curvature at the pole of the ellipsoid, wherein M is equal to a product of the polar radius Rp and a real number h that is selected from a range of values.

11. The optical navigation device of claim 9, wherein at least one of the first and second surfaces is configured to provide a tilting of the output light beam with respect to the central axis of the expanded light beam, wherein the optic element is configured to provide a pre-allocated amount of optical tilting in each of the two surfaces.

12. The optical navigation device of claim 1, wherein the first off-axis angle a is in a range between about 5 degrees and about 45 degrees.

13. The optical navigation device of claim 1, wherein the input light beam is directed upon the first surface at a first off-axis angle a that is in a range between about 10 degrees and about 35 degrees.

14. The optical navigation device of claim 1, wherein g ranges from 1 to 2.5.

15. The optical navigation device of claim 1, wherein the off-axis angle b ranges from about 2 degrees to about 30 degrees.

16. An optical navigation device comprising:
   a light source having a central axis, the light source configured for generating a light beam; and
   an optic element that includes a first surface comprising a spherical portion, the spherical portion having an axis that is parallel to the central axis of the light source for receiving the input light beam at an offset position on the first surface, and generating therefrom, an expanded light beam.

17. The optical navigation device of claim 16, wherein the optic element further comprises a second surface configured for receiving the expanded light beam at an off-axis angle b with reference to a central axis of the expanded light beam, and generate therefrom, an output light beam.

18. The optical navigation device of claim 17, wherein the first surface bends the light beam by M degrees relative to the central axis of the light source, and the second surface bends the light beam by N degrees relative to an axis of the expanded and once bent light beam.

19. A method for optically expanding, collimating, and bending a light beam comprising:
   receiving in a spherical portion of a first surface of an optic element, a light beam at a first off-axis angle, the first off axis angle being an angle between a center axis of the spherical portion and a central axis of the received light beam;
   using the first surface of the optic element for expanding the light beam to a second beam angle and bending the light beam to generate an expanded and once bent light beam; and
   using a second surface of the optic element for collimating and bending the expanded and once bent light beam to generate a substantially collimated, twice-bent light beam.

20. The method of claim 19 wherein the first surface bends the light beam by M degrees relative to the central axis of the received light beam, and the second surface bends the light beam by N degrees relative to an axis of the expanded and once bent light beam.

* * * * *

UNITED STATES PATENT AND TRADEMARK OFFICE
CERTIFICATE OF CORRECTION

| | | |
|---|---|---|
| PATENT NO. | : 7,495,837 B2 | Page 1 of 1 |
| APPLICATION NO. | : 11/048470 | |
| DATED | : February 24, 2009 | |
| INVENTOR(S) | : George E Smith et al. | |

It is certified that error appears in the above-identified patent and that said Letters Patent is hereby corrected as shown below:

Column 7, Line 33 (approx.), Claim 1, delete "off axis" and insert --off-axis--.

Column 8, Line 43 (approx.), Claim 1, delete "off axis" and insert --off-axis--.

Signed and Sealed this

Twenty-first Day of December, 2010

David J. Kappos
*Director of the United States Patent and Trademark Office*